Feb. 6, 1934.     C. C. CHRIST     1,945,678
LUBRICATED OIL INJECTOR
Filed Sept. 21, 1932
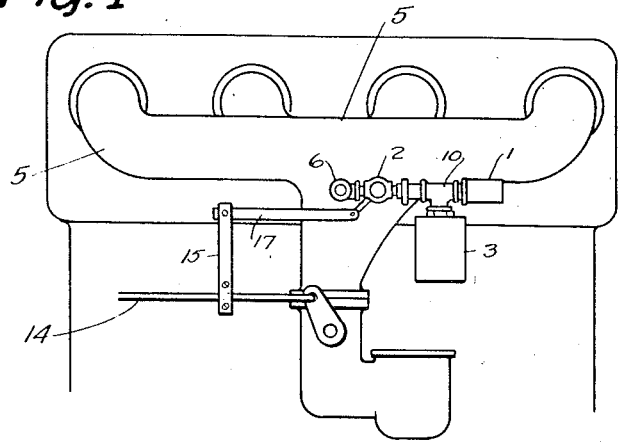
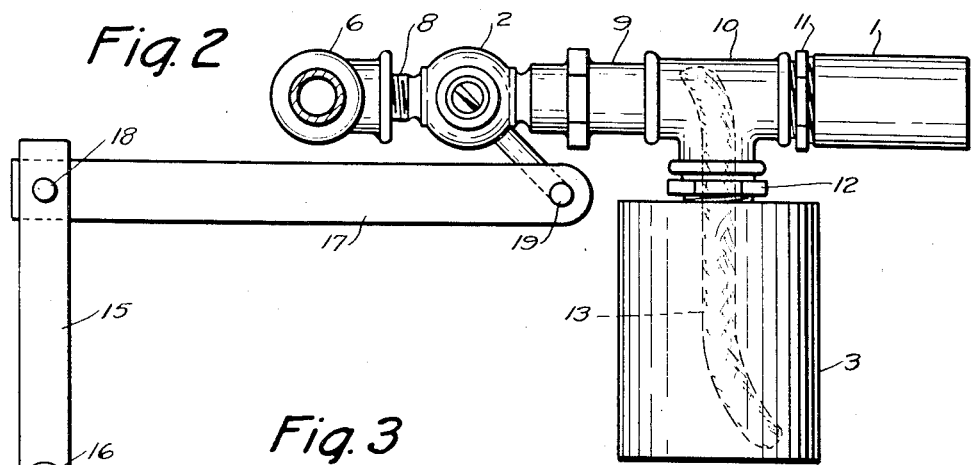
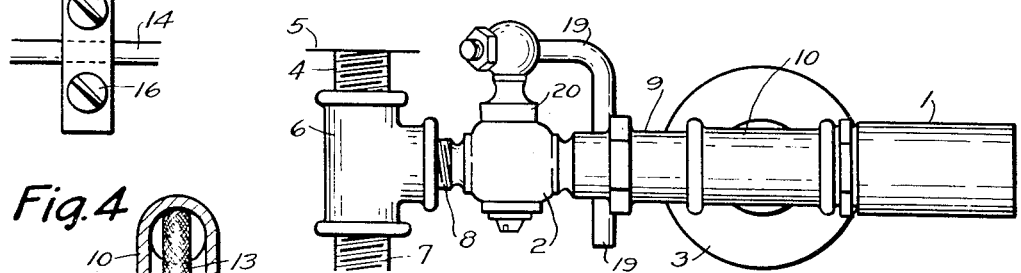
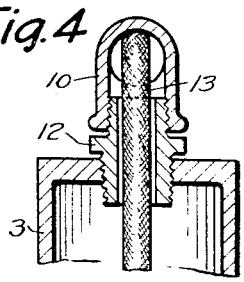
INVENTOR
Charles C. Christ
BY
James Harrison Bowen
ATTORNEY Patented Feb. 6, 1934

1,945,678

UNITED STATES PATENT OFFICE 1,945,678

LUBRICATED OIL INJECTOR

Charles C. Christ, Lyndhurst, N. J.

Application September 21, 1932
Serial No. 634,207

5 Claims. (Cl. 123—196)

The invention is a device that may be attached to the intake manifold of internal combustion engines which admits lubricated air to the intake manifold and is controlled by the accelerator so that the air will be injected with the gasoline and shut off as the gasoline is shut off.

The object of the invention is to inject lubricated air into the intake manifold of an internal combustion engine.

Another object of the invention is to inject the lubricated air only when the throttle valve is open.

Another object of the invention is to provide means for injecting air into the intake manifold in which the amount of air injected is proportionate to the amount of gas passing into the manifold.

Another object of the invention is to provide means for injecting lubricated air to an intake manifold which will automatically close as the throttle valve is closed.

A further object of the invention is to provide a lubricated air injector for intake manifolds which may readily be installed or removed.

And a still further object of the invention is to provide a lubricated air injector which is of a simple and economical construction.

With these ends in view the invention embodies a tubular member having fittings at one end adapted to be screwed into a tapped opening in an intake manifold, a valve in said tubular member having means connecting it to the accelerator rod of the engine, and a container extending downward from said tubular member and having a wick therein extending upward into said tubular member.

Other features and advantages of the invention will appear from the following description taken in connection with the drawing, wherein:

Figure 1 is a view showing the device installed on the intake manifold and accelerator rod of an internal combustion engine.

Figure 2 is an elevation of the device showing the construction thereof.

Figure 3 is a plan view of the device.

Figure 4 is a cross section thru the connection to the lubricator container.

Figure 5 is a cross section thru the valve showing the arrangement of the passage therethru.

In the drawing the device is shown as it would be made wherein numeral 1 indicates the tubular air inlet member, numeral 2 the control valve, and numeral 3 the lubricator tank.

The air inlet member 1 is shown of a tubular shape and is connected by pipe fittings to a nipple 4 which may be screwed into a tapped opening in an intake manifold 5. It will be noted that this may be connnected in the same opening that is provided for the wind-shield wiper and a fitting 6 may be provided on the nipple 4 so that the wiper connection may be made thru a nipple 7 at the opposite side. The valve 2 is provided with a threaded shank 8 which is screwed into the fitting 6, as shown in Figure 3, and the other side of the valve is connected by a sleeve 9 to a fitting 10 into the opposite end of which the member 1 is connected by a bushing 11 and to the lower side of which the tank 3 is connected by a bushing 12. It will be noted that whereas these parts are described as standard pipe fittings the entire device may be made as one piece of material or may be divided into as many parts as may be desired and the parts and fittings may be formed in any manner. It will be noted that the fittings as described provide a direct passage from the member 1 to the intake manifold thru the nipple 4 with the valve 2 opened and with the valve closed this passage is closed. A wick 13 may be provided in the tank 3 and this may extend upward into the fitting 10, as shown in Figures 2 and 4. The tank 3 may be filled with castor oil or any other lubricant desired and it will be noted that the wick will keep a supply of this oil in the path of the incoming air so that the air will be saturated with oil and therefore lubricated. The lubricated air is therefore admitted or injected into the intake manifold so that overhead lubrication is provided and it has been found that by admitting the lubricated air at this point the mileage of the gasoline is materially increased.

The valve 2 may be opened and closed by any means desired, however, it is preferred to connect it to the accelerator rod 14 by bars 15 which are clamped to the rod by screws 16 and a yoke 17 which is pivotally attached to the bars 15 by a pin 18 and also pivotally attached to an arm 19 extending from the valve core 20, as shown in Figure 3. These parts are shown in such a position that the valve will be closed in Figures 1 and 5 and so that the valve will be opened in Figures 2 and 3. It will be noted that the valve core 20 is provided with a passage 21 and the edges of the passage 21 are bevelled, as indicated at the points 22, which permit the valve to gradually open before the actual passage 21 is in line with the opening thru the valve. It will be noted that these corners or edges may be rounded or bevelled as much as desired in order to provide a fast or slow opening.

It will be noted that the accelerator rod 14 is connected to the throttle valve of the carburetor and this rod is in various positions for different types of carburetors and engines so that the connection between the valve 2 and the accelerator rods and also the general construction of the entire device may be varied considerably for different types of engines. The apparatus shown being only typical.

It will, therefore, be understood that changes may be made in the construction without departing from the spirit of the invention. One of which changes may be in the use of other means for connecting the device to the intake manifold, another may be in the location of the point at which it is connected as it will be understood it may be located at any point in the manifold, another may be in the use of a valve of a different type, another may be in the use of other means for operating the valve, another may be in the use of other means for supplying the lubricant, and another may be in the use of other means for feeding the lubricant to the incoming air.

The construction will be readily understood from the foregoing description. In use the device may be provided and installed as shown and described and it will be noted that normally the valve 2 is in the closed position and when the accelerator is moved to open the throttle valve the valve 2 is also automatically opened and the valve will be gradually opened so that only a small amount of the lubricated air will be admitted first and as the throttle valve is opened wide a larger, or proportionate amount of the lubricated air will be admitted. It will also be noted that as soon as the throttle valve is closed the valve 2 is also closed so that there is no danger of stalling the engine by admitting an over supply of air while the engine is idling.

Having thus fully described the invention what I claim as new and desire to secure by Letters Patent, is:

1. A lubricated air injector comprising a tubular member adapted to be installed on the intake manifold of an internal combustion engine, a valve in said member said tubular member directly connected to said intake manifold and providing free air passage from the atmosphere thereto when the valve is in the open position, means controlling said valve by the accelerator connecting rod, a lubricator storage chamber in connection with said tubular member, and a wick extending from said storage chamber into said tubular member.

2. An attachment for internal combustion engines having intake manifolds with carburetors in combination therewith comprising a member attached to the intake manifold providing a direct and free air passage from the atmosphere to the manifold, a valve in said passage, means operating the valve with the carburetor operating means, a lubricant reservoir positioned below said member, and a wick extending from said reservoir into the path of air passing thru said member.

3. In an auxiliary air inlet device for the intake manifold of internal combustion engines having a carburetor, said device providing a direct and free air passage from the atmosphere to the intake manifold, a lubricant reservoir in combination therewith, a wick extending from said reservoir into said free air passage, a valve in said device positioned between the lubricant reservoir and the intake manifold, and means connecting said valve to the carburetor operating means.

4. In a device as described in claim 3, bleeder openings in the valve providing gradual opening thereof permitting a comparatively small amount of air to enter the manifold when the engine is starting.

5. In an auxiliary air inlet device for the intake manifold of internal combustion engines in which the manifold is provided with a carburetor, said device having a member connected to the intake manifold providing free air passage from the atmosphere to the manifold, means exposing a small amount of lubricant to the air in the free air passage in order that the air may absorb some of the lubricant, and a valve in said member between the manifold and the point at which the lubricant is exposed to the air, said valve operated with the carburetor.

CHARLES C. CHRIST.